US012357996B2

(12) United States Patent
Leung

(10) Patent No.: US 12,357,996 B2
(45) Date of Patent: Jul. 15, 2025

(54) PIPETTE TIP TRAY

(71) Applicant: Life Technologies Corporation, Carlsbad, CA (US)

(72) Inventor: Patrick Leung, Carlsbad, CA (US)

(73) Assignee: LIFE CORPORATION, Carlsbad, CA (US)

( * ) Notice: Subject to any disclaimer, the term of this patent is extended or adjusted under 35 U.S.C. 154(b) by 652 days.

(21) Appl. No.: 17/090,659

(22) Filed: Nov. 5, 2020

(65) Prior Publication Data

US 2021/0129154 A1 May 6, 2021

Related U.S. Application Data

(60) Provisional application No. 62/931,792, filed on Nov. 6, 2019.

(51) Int. Cl.
*B01L 9/00* (2006.01)

(52) U.S. Cl.
CPC ......... *B01L 9/543* (2013.01); *B01L 2300/041* (2013.01); *B01L 2300/0809* (2013.01); *B01L 2300/0848* (2013.01)

(58) Field of Classification Search
CPC ...... B01L 9/54; B01L 9/543; B01L 2300/041; B01L 2300/0809; B01L 2300/0848
See application file for complete search history.

(56) References Cited

U.S. PATENT DOCUMENTS

2012/0058900 A1* 3/2012 Gisler ................ G01N 35/0099 506/7
2012/0328489 A1* 12/2012 Beese .................. B65D 25/108 422/526
2013/0336852 A1* 12/2013 Rethwisch .............. B01L 9/543 422/564
2014/0206088 A1* 7/2014 Lentz ...................... B01L 3/527 422/549

FOREIGN PATENT DOCUMENTS

EP 2338596 A1 6/2011

* cited by examiner

*Primary Examiner* — Elizabeth A Robinson
*Assistant Examiner* — Austin Q Le

(57) ABSTRACT

A pipette tip holder includes a tray including an array of openings to receive pipette tips. A plurality of the openings provide access to interiors of a plurality of enclosures. At least one opening of the array of openings of the array is free of an enclosure. The pipette tip holder further includes a container. The tray is secured over a mouth of the container. The at least one opening of the array of openings provides access through the tray to the interior of the container.

9 Claims, 8 Drawing Sheets

PIPETTE TIP TRAY

CROSS-REFERENCE TO RELATED APPLICATION(S)

This application claims benefit of U.S. Provisional Application No. 62/931,792, filed Nov. 6, 2019, which is incorporated herein by reference in its entirety.

BACKGROUND

The biotechnology and analytical chemistry industries are increasingly seeking automation and performing large-scale testing. Such automation is turning to robotic systems that take the place of manual manipulation of solutions and reagents. In particular, the robotic systems incorporate three-axis pipetting robots that can transfer precise amounts of liquid from one container to another.

However, such automated systems utilize large quantities of consumables, such as well plates and pipetting tips. To avoid cross-contamination between samples and reagents used in various steps within a test, a new pipette tip is often selected each time a new liquid transfer is to take place. After each pipette tip is used once, it is often discarded with whatever liquid remains within the pipette tip. As such, used pipette tips are disposed within containers that include waste liquids from each step within the testing process. Such mixed waste is difficult to discard given the nature of the reagents used within the tests.

BRIEF DESCRIPTION OF THE DRAWINGS

The present disclosure may be better understood, and its numerous features and advantages made apparent to those skilled in the art by referencing the accompanying drawings.

The use of the same reference symbols in different drawings indicates similar or identical items.

DETAILED DESCRIPTION

In an embodiment, a pipette tip holder includes a tray including an array of openings to receive pipette tips. The plurality of the openings provide access to interiors of enclosures defined by the tray or alternatively formed in a separate piece coupled under the tray. At least one of the openings of the array of openings is free of an enclosure. The tray is secured over a mouth of the container. At least one opening free of an enclosure provides access through the tray to the interior of the container. Pipette tips can be disposed in the openings of the array of openings. Optionally, a cover can be applied over the tray and the pipette tips.

In another embodiment, a method for dispensing liquid includes selecting a pipette from the pipette tips disposed within an array of openings of a pipette tip holder. The method further includes drawing liquid from a liquid source with the pipette tip, expelling the liquid from the pipette tip through at least one opening of the array not associated with an enclosure and into the interior of the container of the pipette tip holder. The method also includes placing the pipette tip into an opening of the array of openings other than the opening that provides access to the interior of the container.

Figure 1:
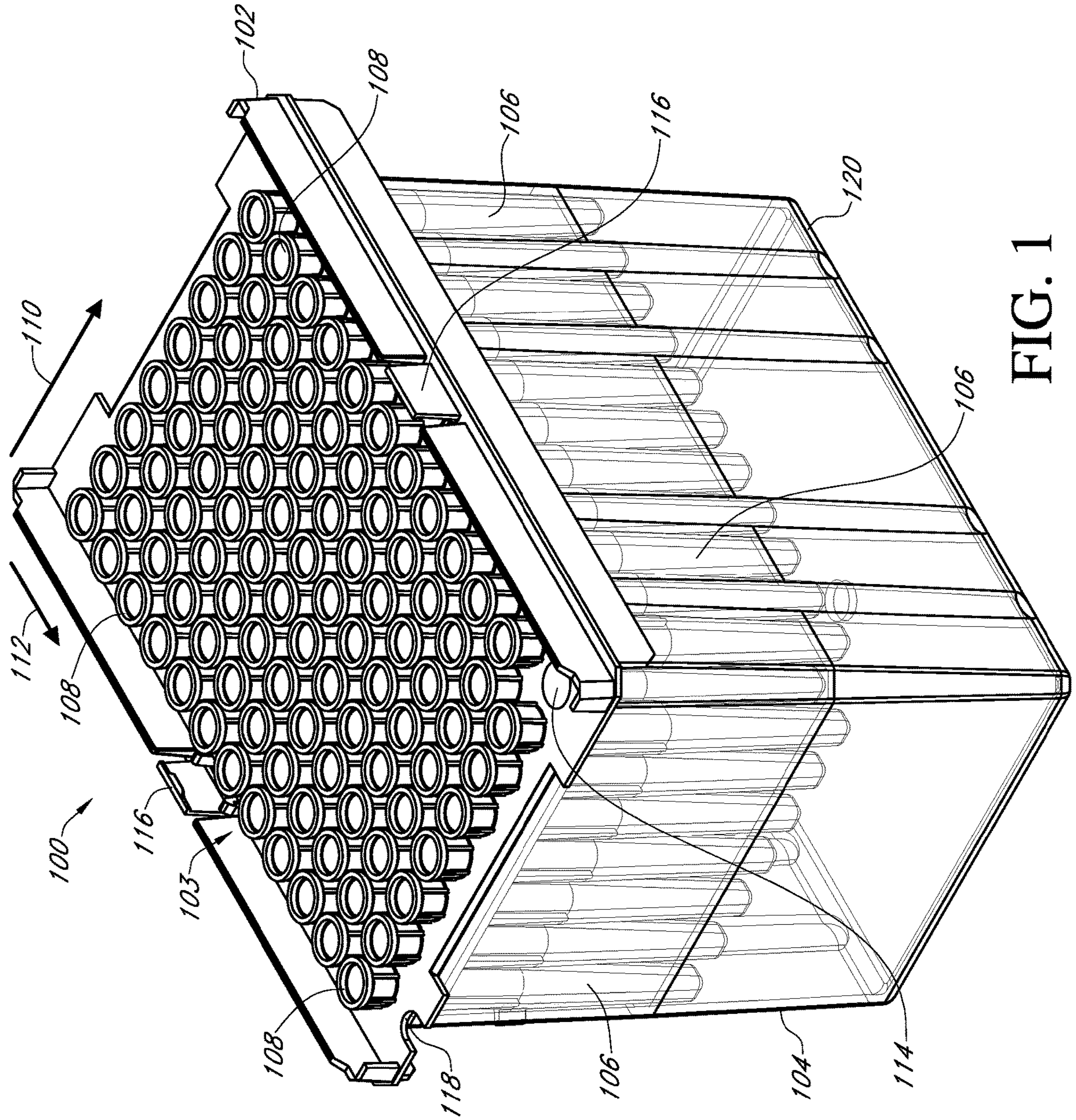
FIG. 1 and FIG. 2 include perspective views an example pipette tip container.
Figure 2:
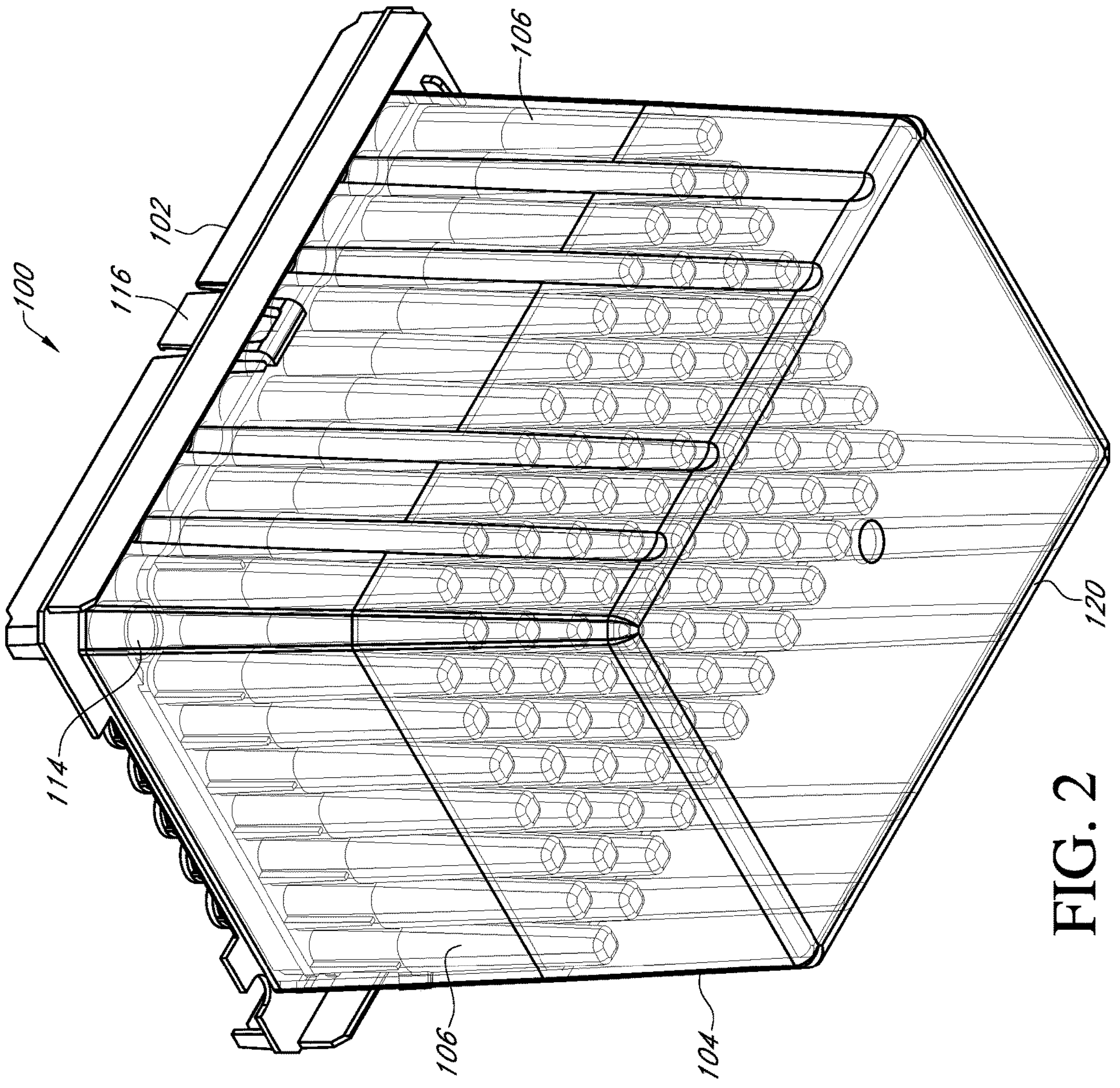

As illustrated in FIG. 1 and FIG. 2, a pipette tip holder 100 includes a tray 102 coupled to the container 104. The tray 102 defines an array of openings 103 into which pipette tips 108 can be placed.

The tray 102 further defines enclosures 106. Enclosures 106 can be each uniquely associated with an opening in the array 103 of openings. The pipette tips 108 can be inserted into an opening of the array 103 of openings or through an opening of the array 103 of openings and into an enclosure 106. As such, the enclosures 106 isolate the pipette tips from other enclosures 106. The enclosures 106 extend from the tray into the interior of the container 104.

At least one opening 114 does not have an associated enclosure or is free of an enclosure. Instead the at least one opening 114 provides access to an interior of the container 104. In an example, the array 103 of openings is arranged in a set of columns 110 and rows 112. The opening 114 of an enclosure can be disposed at a corner of the array 103. While the array 103 is illustrated as being a rectangular arranged in rows 110 and columns 112, the array 103 of openings can be arranged in another polygonal or circular arrangements.

The tray 102 is secured to the container 104 at a mouth 118 of the container 104. For example, the tray 102 can define clips 116 that are secured to complementary structures on the container 104.

The container 104 can be tapered. For example, the container 104 can have a wider cross-section at a mouth 118 than a bottom 120 of the container 104. Further, the container 104 can be formed of a polymeric material which optionally can be transparent. Alternatively, the polymeric material is opaque. In particular, the container 104 can be molded from thermoplastic polymers.

Figure 3:
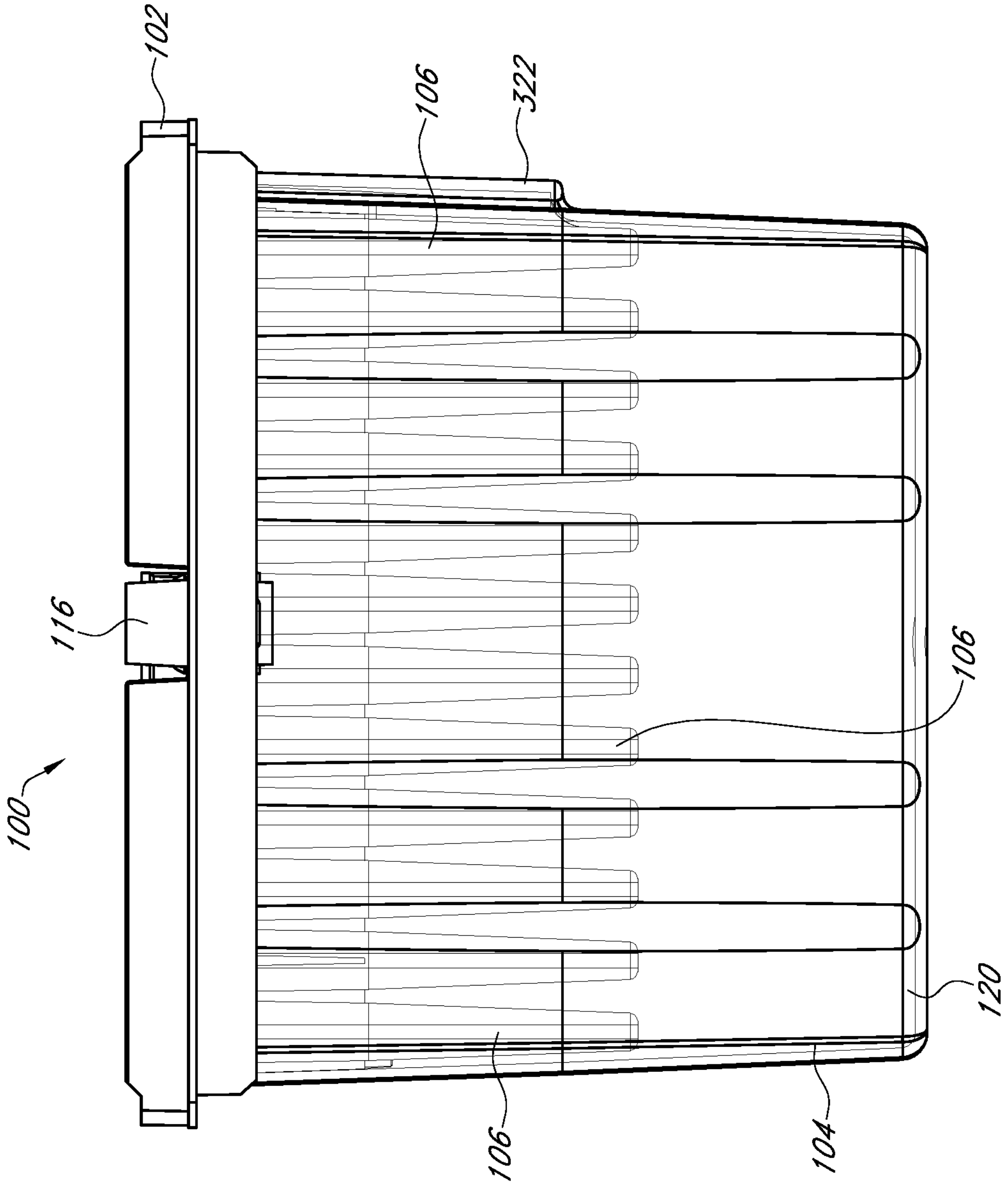
FIG. 3 and FIG. 4 include side view illustrations of the example pipette tip holder.
Figure 4:
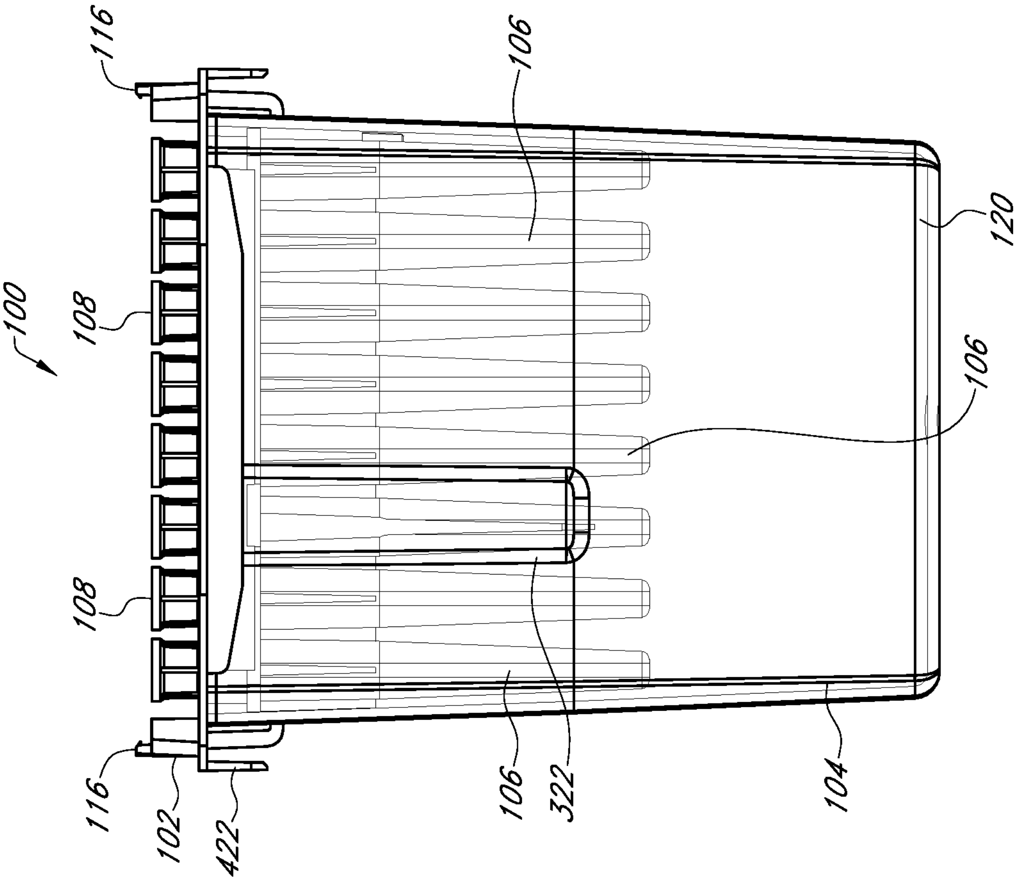

As illustrated in FIG. 3 and FIG. 4, the container 104 can further define ribs and protrusions, such as structure 322. Such a structure 322 can be used to ensure the desired orientation of the container and pipette tip holder 100 when applied into a complementary cavity of an instrument. As such, the location of the opening 114 that accesses the interior of the container 104 is disposed in a known location relative to the instrument.

The tray 102 can further include wings 424. Such wings 424 can be useful in positioning the pipette tip holder 100 within an instrument. Further, such wings 424 can be useful in connecting a cover over the tray 102.

Figure 5:
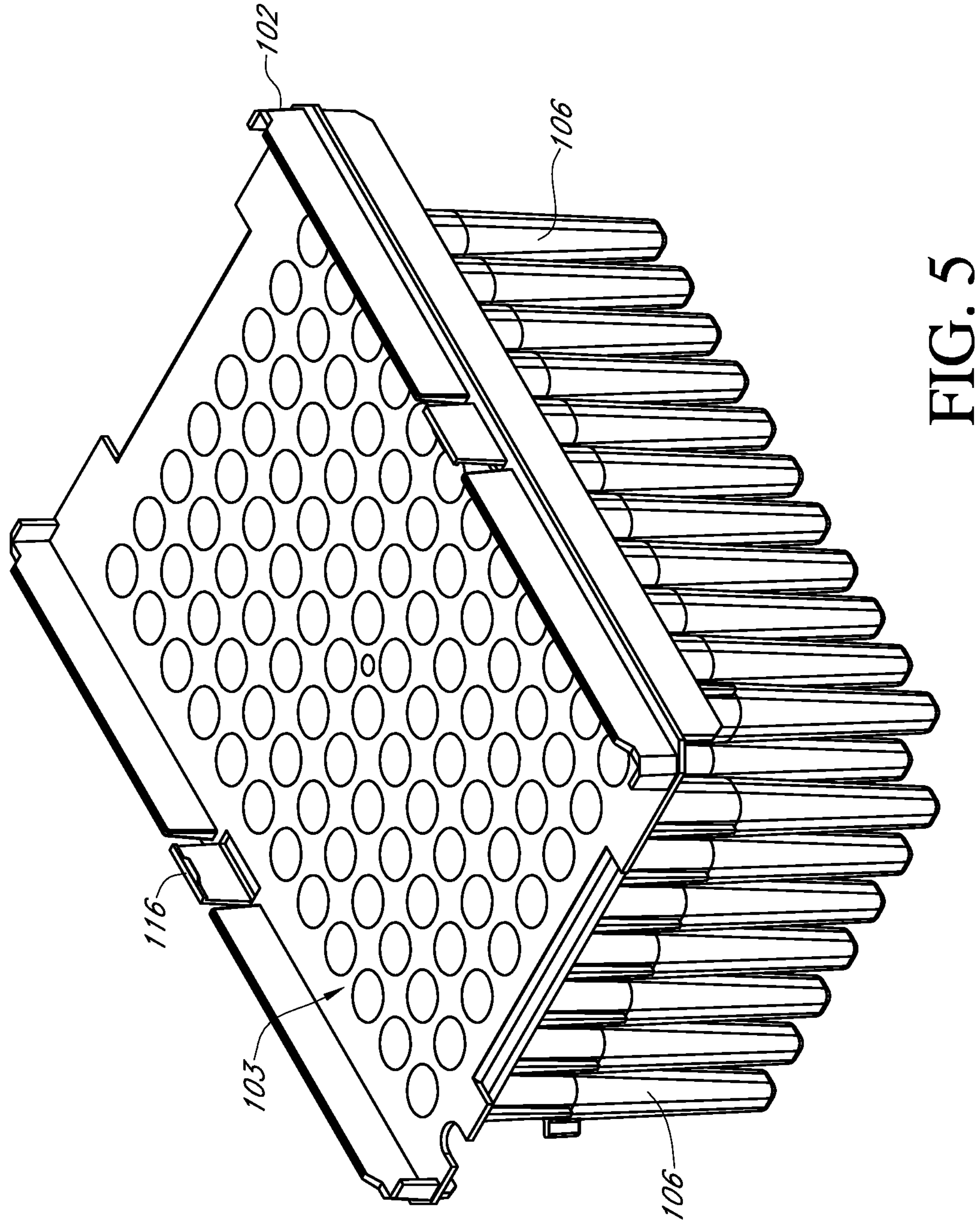
FIG. 5 and FIG. 6 include illustrations of an example tray.
Figure 6:
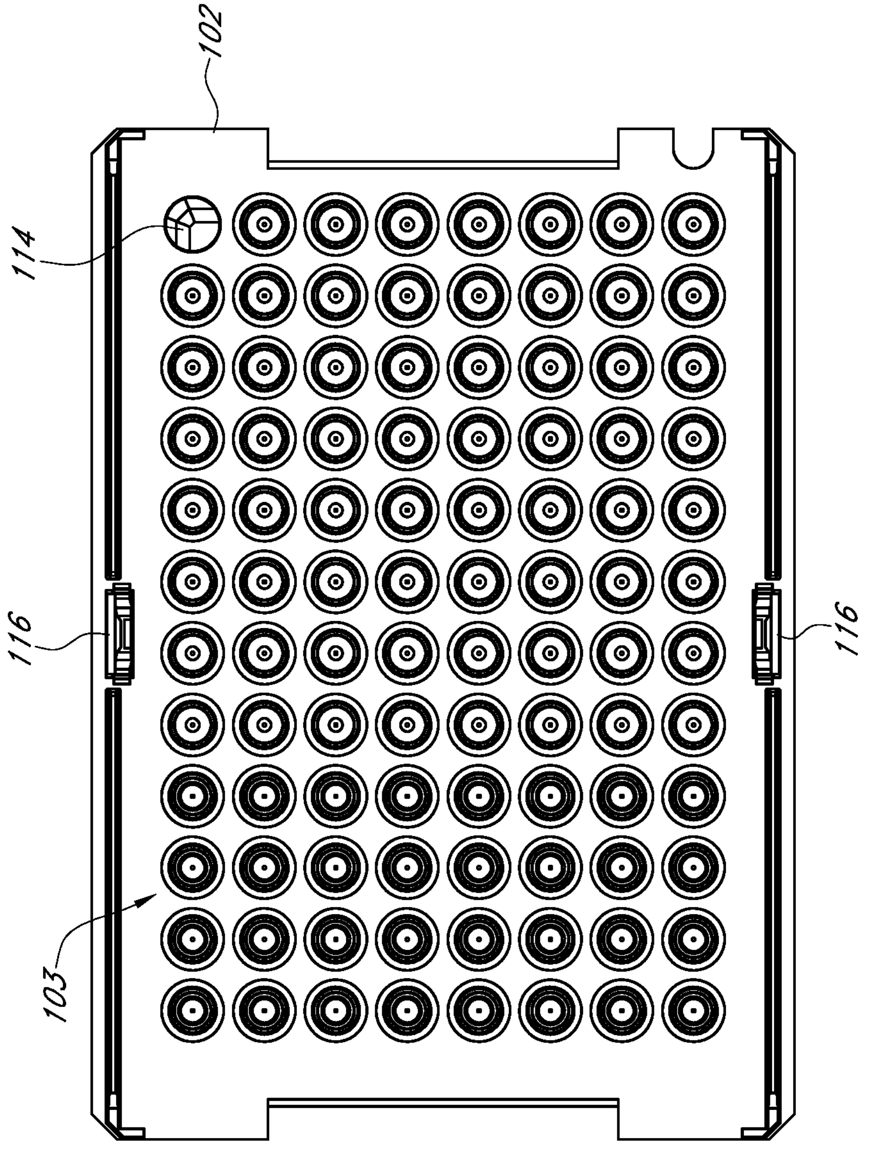

FIG. 5 includes an illustration of the tray 102, illustrating the array 103 of openings. FIG. 6 includes an illustration of a top of the tray 102 with the openings arranged in rows and columns. Optionally, the enclosures 106 are arranged under the tray 102. The enclosures 106 can be formed as part of the tray 102 or as a separate component coupled with the tray 102.

Figure 7:
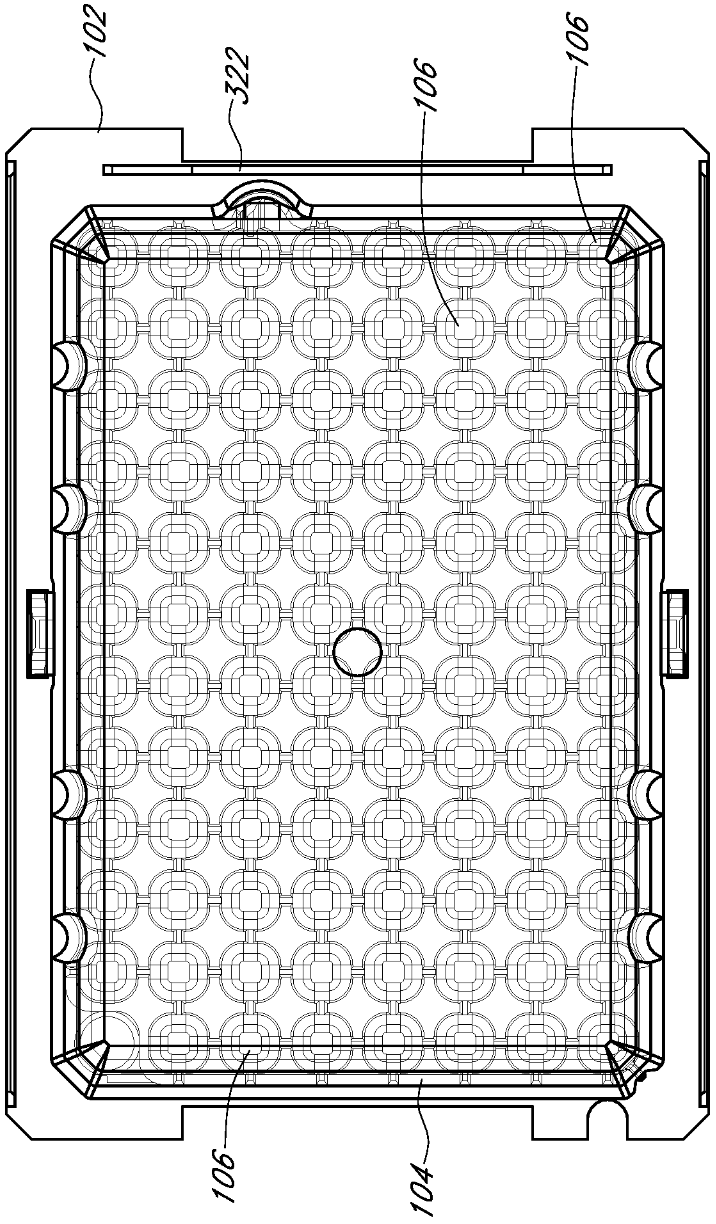
FIG. 7 includes a bottom view illustration of the example pipette tip holder.
Figure 8:
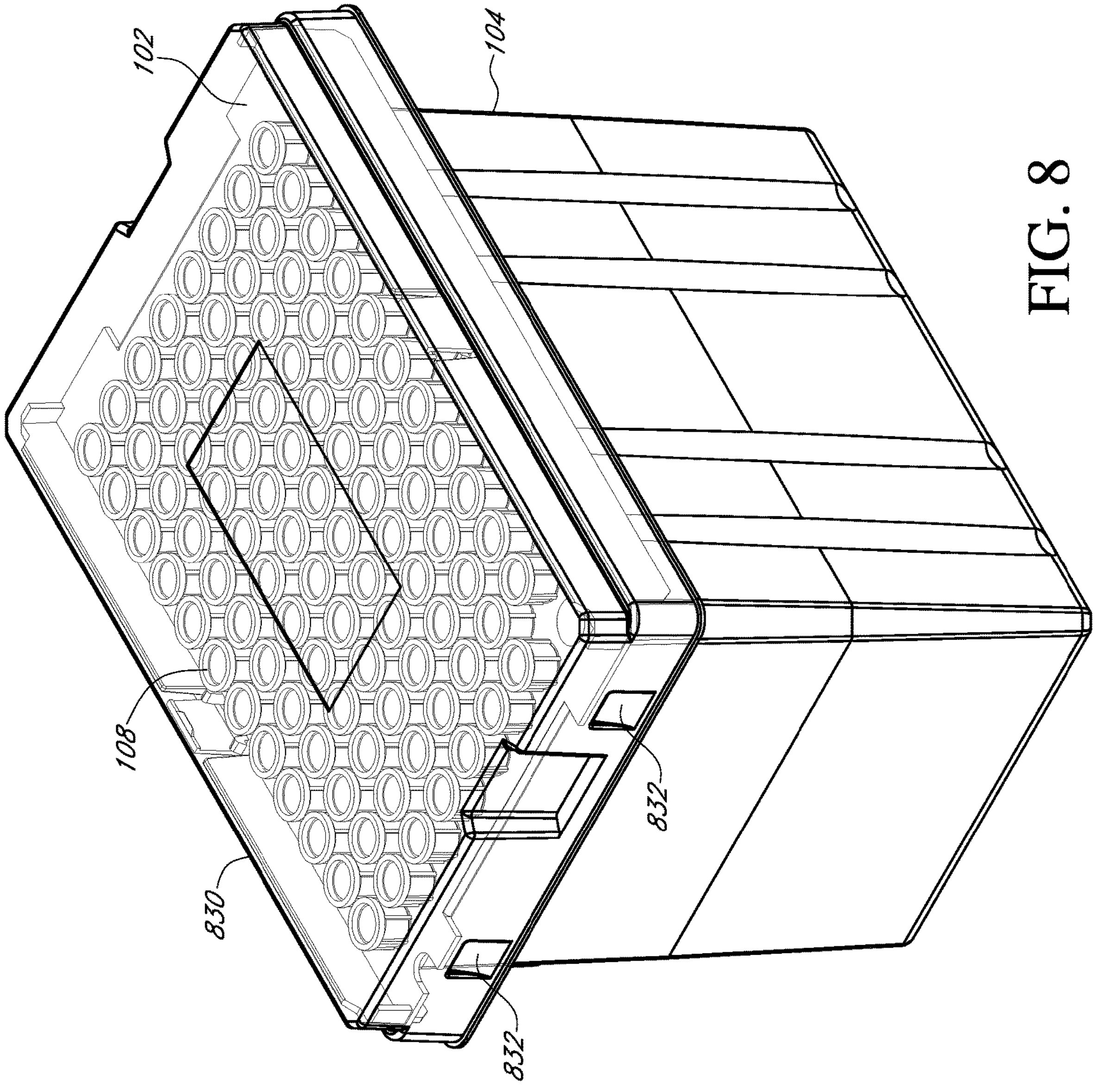
FIG. 8 includes a further perspective view of the example pipette tip holder.

FIG. 7 illustrates a bottom view of the pipette tip holder 100. As illustrated, the enclosures 106 are arranged to extend into the container 104. The clips 116 of the tray 102 are coupled with the container 104. As illustrated in FIG. 8, a cover 830 can be disposed over the array of pipette tips 108 and secured to the tray 102. For example, clips 932 can secure the cover 930 to the tray 102.

In use a pipetting robot, such as a three-axis pipetting robot, can select a pipette tip from the plurality of pipette tips. Alternatively, the plurality of pipette tips can be stored in a separate tray, the pipette tip selected from the pipette tips stored on that separate tray. The pipette tip can be used to draw fluid from a fluid source. When the operation is complete, liquid remaining in the pipette tip is dispensed in the opening providing access to the interior of the container. The pipette tip can be placed into an opening within the array associated with an enclosure. The process can be repeated with a second tip used to pipette a second liquid. Remaining liquid in the second tip can be dispensed through the opening providing access to the interior of the container, and the second tip can be placed in another opening also associated with an enclosure. As such, the enclosures isolate used tips from other used pipette tips.

In a first aspect, a pipette tip holder includes a tray including an array of openings to receive pipette tips. A plurality of the openings provide access to interiors of a plurality of enclosures. At least one opening of the array of openings of the array is free of an enclosure. The pipette tip holder further includes a container. The tray is secured over a mouth of the container. The at least one opening of the array of openings provides access through the tray to the interior of the container.

In an example, of the first aspect, the enclosures extend into the container.

In another example of the first aspect and the above examples, the array of openings is arranged in columns and rows of openings. For example, the at least one opening of the array of openings is disposed at a corner of the array of openings arranged in columns and rows of openings.

In a further example of the first aspect and the above examples, the pipette tip holder further includes a plurality of pipette tips disposed in the array of openings. For example, the at least one opening is free of a pipette tip. In another example, a pipette tip of the plurality of pipette tips extends through an opening of the array of openings and into an enclosure of the plurality of enclosures.

In an additional example of the first aspect and the above examples, the pipette tip holder further includes a cover secured to the tray and over the array of openings.

In another example of the first aspect and the above examples, the tray defines a clip to secure the tray to a lip of the container.

In a further example of the first aspect and the above examples, the container is tapered to have a large cross-section at the mouth than at a bottom of the container.

In an additional example of the first aspect and the above examples, each enclosure of the plurality of enclosures defines a volume isolated from volumes of other enclosures of the plurality of enclosures and isolated from an interior of the containers.

In a second aspect, a method of dispensing liquid includes selecting a pipette tip from a plurality of pipette tips disposed in an array of openings of a pipette tip holder. The pipette tip holder includes a tray including the array of openings. A plurality of the openings provide access to interiors of a plurality of enclosures. At least one opening of the array of openings of the array is free of an enclosure. The pipette tip holder further includes a container. The tray is secured over a mouth of the container. The at least one opening of the array of openings provides access through the tray to the interior of the container. The method further includes drawing liquid from a liquid source with the pipette tip, expelling the liquid from the pipette tip through the at least one opening and into the interior of the container, and placing the pipette tip into an opening of the array of openings other than the at least one opening.

In an example of the second aspect, the method further includes selecting a second pipette tip from the plurality of pipette tips and drawing a second liquid from a second liquid source. For example, the method further includes expelling the second liquid from the second pipette tip through the at least one opening and placing the second pipette tip in a second opening of the array of openings.

In another example of the second aspect and the above examples, the opening into which the pipette tip is place is isolated from the interior of the container and other pipette tips of the plurality of pipette tips be an enclosure of the plurality of enclosures.

In a further example of the second aspect and the above examples, the array of openings is arranged in columns and rows of openings. For example, the at least one opening of the array of openings is disposed at a corner of the array of openings arranged in columns and rows of openings.

In an additional example of the second aspect and the above examples, the tray defines a clip to secure the tray to a lip of the container.

In another example of the second aspect and the above examples, the container is tapered to have a large cross-section at the mouth than at a bottom of the container.

In a further example of the second aspect and the above examples, a cover is secured to the tray and over the array of openings, the method further comprising removing the cover and optionally, placing the tray into an instrument, such as a sequencing instrument.

Note that not all of the activities described above in the general description or the examples are required, that a portion of a specific activity may not be required, and that one or more further activities may be performed in addition to those described. Still further, the order in which activities are listed are not necessarily the order in which they are performed.

In the foregoing specification, the concepts have been described with reference to specific embodiments. However, one of ordinary skill in the art appreciates that various modifications and changes can be made without departing from the scope of the invention as set forth in the claims below. Accordingly, the specification and figures are to be regarded in an illustrative rather than a restrictive sense, and all such modifications are intended to be included within the scope of invention.

As used herein, the terms "comprises," "comprising," "includes," "including," "has," "having" or any other variation thereof, are intended to cover a non-exclusive inclusion. For example, a process, method, article, or apparatus that comprises a list of features is not necessarily limited only to those features but may include other features not expressly listed or inherent to such process, method, article, or apparatus. Further, unless expressly stated to the contrary, "or" refers to an inclusive-or and not to an exclusive-or. For example, a condition A or B is satisfied by any one of the following: A is true (or present) and B is false (or not present), A is false (or not present) and B is true (or present), and both A and B are true (or present).

Also, the use of "a" or "an" are employed to describe elements and components described herein. This is done merely for convenience and to give a general sense of the scope of the invention. This description should be read to include one or at least one and the singular also includes the plural unless it is obvious that it is meant otherwise.

Benefits, other advantages, and solutions to problems have been described above with regard to specific embodiments. However, the benefits, advantages, solutions to problems, and any feature(s) that may cause any benefit, advantage, or solution to occur or become more pronounced are not to be construed as a critical, required, or essential feature of any or all the claims.

After reading the specification, skilled artisans will appreciate that certain features are, for clarity, described herein in the context of separate embodiments, may also be provided in combination in a single embodiment. Conversely, various features that are, for brevity, described in the context of a single embodiment, may also be provided separately or in any subcombination. Further, references to values stated in ranges include each and every value within that range.

What is claimed is:

1. A method of dispensing liquid, the method comprising:

selecting a pipette tip from a plurality of pipette tips disposed in an array of openings of a pipette tip holder, the pipette tip holder including:

a tray defining a plurality of enclosures and the array of openings, a plurality of the array of openings providing access to interiors of the plurality of enclosures, an interior of each enclosure of the plurality of enclosures isolated from an interior of a container, at least one opening of the array of openings free of an enclosure; and the container, the tray secured over a mouth of the container, the at least one opening of the array of openings providing access through the tray to the interior of the container;

drawing liquid from a liquid source with the pipette tip;

expelling the liquid from the pipette tip through the at least one opening of the array of openings and into the interior of the container; and placing the pipette tip into an opening of the array of openings other than the at least one opening.

2. The method of claim 1, further comprising selecting a second pipette tip from the plurality of pipette tips and drawing a second liquid from a second liquid source.

3. The method of claim 2, further comprising expelling the second liquid from the second pipette tip through the at least one opening and placing the second pipette tip in a second opening of the array of openings other than the at least one opening.

4. The method of claim 1, wherein the opening into which the pipette tip is place is associated with an enclosure of the plurality of enclosures and is isolated from the interior of the container and other pipette tips of the plurality of pipette tips.

5. The method of claim 1, wherein the array of openings is arranged in columns and rows of openings.

6. The method of claim 5, wherein the at least one opening of the array of openings is disposed at a corner of the array of openings arranged in columns and rows of openings.

7. The method of claim 1, wherein the tray defines a clip to secure the tray to a lip of the container.

8. The method of claim 1, wherein the container is tapered to have a large cross-section at the mouth than at a bottom of the container.

9. The method of claim 1, wherein a cover is secured to the tray and over the array of openings, the method further comprising removing the cover and inserting the tray into an instrument.

* * * * *